US012808602B2

(12) United States Patent
Ono et al.

(10) Patent No.: US 12,808,602 B2
(45) Date of Patent: Nov. 24, 2026

(54) ELECTRODE SHEET DRYING DEVICE

(71) Applicant: TOYOTA JIDOSHA KABUSHIKI KAISHA, Toyota (JP)

(72) Inventors: Masato Ono, Nagoya (JP); Katsuhisa Tsuzuki, Toyota (JP); Shinya Asai, Kariya (JP); Yusuke Yamaguchi, Kariya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 564 days.

(21) Appl. No.: 18/372,386

(22) Filed: Sep. 25, 2023

(65) Prior Publication Data

US 2024/0175628 A1 May 30, 2024

(30) Foreign Application Priority Data

Nov. 24, 2022 (JP) ................................ 2022-187176

(51) Int. Cl.
*F26B 3/30* (2006.01)
*G01J 5/04* (2006.01)

(52) U.S. Cl.
CPC . *F26B 3/30* (2013.01); *G01J 5/04* (2013.01)

(58) Field of Classification Search
CPC . F26B 3/30; F26B 13/10; H01M 4/04; H01M 4/139; G01J 5/04
See application file for complete search history.

(56) References Cited

U.S. PATENT DOCUMENTS

2019/0195694 A1 6/2019 Tang et al.

FOREIGN PATENT DOCUMENTS

| | | | | |
|---|---|---|---|---|
| CN | 101562918 | A | | 10/2009 |
| JP | S63319152 | A | * | 12/1988 |
| JP | H01124727 | A | * | 5/1989 |
| JP | 4-130746 | A | | 5/1992 |
| JP | H0630132 | U | * | 4/1994 |
| JP | 2008267858 | A | * | 11/2008 |
| JP | 2013-026444 | A | | 2/2013 |
| JP | 5984643 | B2 | | 9/2016 |
| JP | 2017-177657 | A | | 10/2017 |
| JP | 2019-211227 | A | | 12/2019 |
| JP | 2022-037762 | A | | 3/2022 |

OTHER PUBLICATIONS

Translation, JP-H01124727-A (Year: 1989).*
Translation, JP-2008267858-A (Year: 2008).*
Translation, JP-H0630132-U (Year: 1994).*
Translation, JP-S63319152-A (Year: 1988).*

* cited by examiner

*Primary Examiner* — Jessica Yuen
(74) *Attorney, Agent, or Firm* — Sughrue Mion, PLLC

(57) ABSTRACT

An infrared heater is disposed on one side of an electrode sheet transferred along a transfer path. A radiation temperature sensor is disposed on the other side of the electrode sheet to measure the temperature of the back surface of the electrode sheet corresponding to the back side of a front surface portion of the electrode sheet that is the closest to the infrared heater. The radiation temperature sensor is configured such that the peak wavelength of infrared light radiated to the surface of the electrode sheet by the infrared heater is not included in the detectable wavelength range of infrared light detected by the radiation temperature sensor.

9 Claims, 7 Drawing Sheets

| TY / TX | $T_1$~$T_2$ | $T_2$~$T_3$ | $T_3$~$T_4$ | ····· |
|---|---|---|---|---|
| $T_1$~$T_2$ | $\Delta T_{11}$ | $\Delta T_{12}$ | $\Delta T_{13}$ | ····· |
| $T_2$~$T_3$ | $\Delta T_{21}$ | $\Delta T_{22}$ | $\Delta T_{23}$ | ····· |
| $T_3$~$T_4$ | $\Delta T_{31}$ | $\Delta T_{32}$ | $\Delta T_{33}$ | ····· |
| ⋮ | ⋮ | ⋮ | ⋮ | ····· |

| No. | $x_1$ | $x_2$ | • • • • • • • • • • | $x_{n-1}$ | $x_n$ | $y_t$ |
|---|---|---|---|---|---|---|
| 1 | $x_{11}$ | $x_{21}$ | • • • • • • • • • • | $x_{n-11}$ | $x_{n1}$ | $y_{t1}$ |
| 2 | $x_{12}$ | $x_{22}$ | • • • • • • • • • • | $x_{n-12}$ | $x_{n2}$ | $y_{t2}$ |
| ⋮ | ⋮ | ⋮ | ⋮ | ⋮ | ⋮ | ⋮ |
| m−1 | $x_{1m-1}$ | $x_{2m-1}$ | • • • • • • • • • • | $x_{n-1m-1}$ | $x_{nm-1}$ | $y_{tm-1}$ |
| m | $x_{1m}$ | $x_{2m}$ | • • • • • • • • • • | $x_{n-1m}$ | $x_{nm}$ | $y_{tm}$ |

ELECTRODE SHEET DRYING DEVICE

CROSS-REFERENCE TO RELATED APPLICATION

This application claims priority to Japanese Patent Application No. 2022-187176 filed on Nov. 24, 2022, incorporated herein by reference in its entirety.

BACKGROUND

1. Technical Field

The present disclosure relates to an electrode sheet drying device.

2. Description of Related Art

To manufacture a lithium ion battery, it is occasionally necessary to heat a workpiece for the lithium ion battery, e.g. an electrode sheet, and this heating action is occasionally performed on an electrode sheet being moved by an infrared heater. In this case, the temperature of a front surface portion of the electrode sheet that is the closest to the infrared heater is the highest, and it is often necessary to detect the temperature in a front surface region of the electrode sheet at the highest temperature, that is, the highest temperature region of the electrode sheet. There is known a temperature management system that estimates the temperature in a highest temperature region of an electrode sheet being moved using a radiation temperature sensor (see Japanese Unexamined Patent Application Publication No. 2022-37762 (JP 2022-37762 A), for example). The radiation temperature sensor is configured to detect infrared light that is incident on the radiation temperature sensor to measure the temperature of the surface of an object to which the infrared light is radiated.

SUMMARY

When the temperature in the highest temperature region of the electrode sheet is measured by the radiation temperature sensor, however, the temperature in the highest temperature region of the electrode sheet may not be measured accurately if infrared light radiated from a structure around the electrode sheet is incident on the radiation temperature sensor, since the infrared light acts as disturbances, for example. Thus, in the temperature management system discussed above, the radiation temperature sensor is disposed with a clearance downstream of an infrared heater in the direction of movement of the electrode sheet, a partition wall is disposed between the infrared heater and the radiation temperature sensor to hinder incidence of infrared light that acts as disturbances on the radiation temperature sensor, to measure the temperature of the electrode sheet reduced from the highest temperature using the radiation temperature sensor, calculate the amount of temperature reduction from the highest temperature, and estimate the highest temperature of the electrode sheet based on the calculated amount of temperature reduction.
Even if the highest temperature of the electrode sheet is estimated based on the calculated value, however, the highest temperature of the electrode sheet still cannot be calculated accurately.

In order to address such an issue, the present disclosure provides an electrode sheet drying device that dries an electrode sheet transferred along a transfer path, including: an infrared heater disposed on one side of the electrode sheet: and a radiation temperature sensor disposed on the other side of the electrode sheet, in which the radiation temperature sensor is disposed to be able to measure a temperature of a back surface of the electrode sheet corresponding to a back side of a front surface portion of the electrode sheet that is closest to the infrared heater, and configured such that a peak wavelength of infrared light radiated to a surface of the electrode sheet by the infrared heater is not included in a detectable wavelength range of the infrared light detected by the radiation temperature sensor.

It is possible to continuously calculate the temperature in the highest temperature region of the electrode sheet accurately using the radiation temperature sensor.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
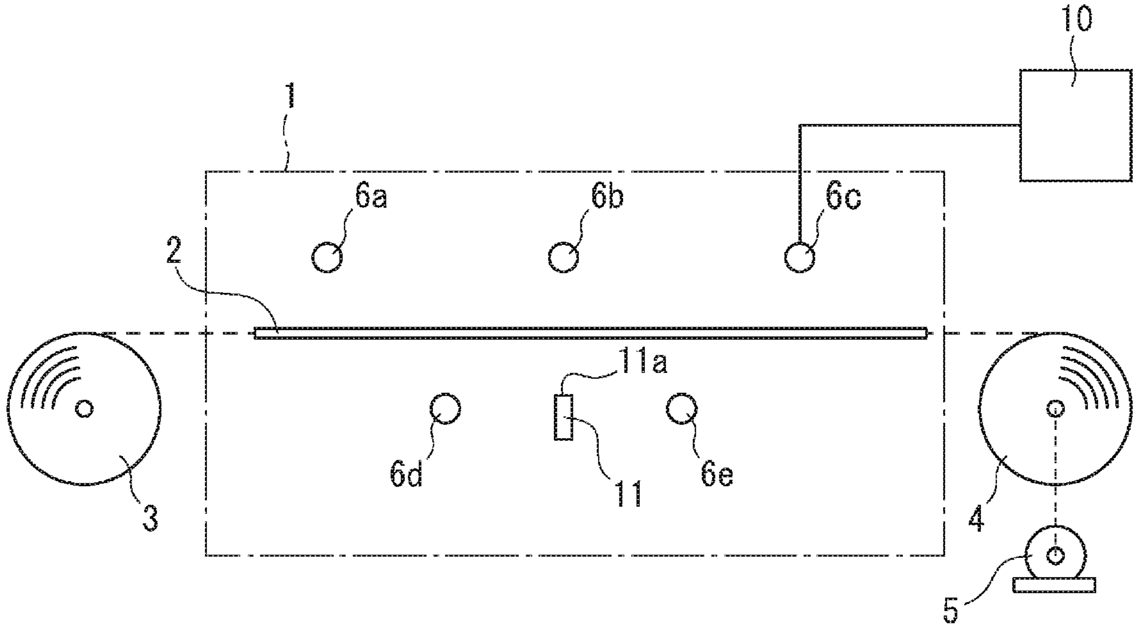
FIG. 1 is a side view diagrammatically illustrating an electrode sheet drying device according to a first embodiment.

FIG. 1 is a side view diagrammatically illustrating the entire electrode sheet drying device according to a first embodiment. With reference to FIG. 1, reference numeral 1 denotes a drying furnace, 2 denotes an electrode sheet, 3 denotes a roll-out roller for the electrode sheet 2, 4 denotes a roll-up roller for the electrode sheet 2, and 5 denotes a drive device for rotationally driving the roll-up roller 4. When the roll-up roller 4 is rotationally driven by the drive device 5, the electrode sheet 2 is continuously transferred in the drying furnace 1 from the roll-out roller 3 toward the roll-up roller 4. Drying work for the electrode sheet 2 is continuously performed in the drying furnace 1 while the electrode sheet 2 is continuously transferred in the drying furnace 1. A roller that guides the electrode sheet 2, a roller that applies a tension to the electrode sheet 2, etc. are provided as necessary, although not illustrated in FIG. 1. In this case, the electrode sheet 2 may be transferred by a different method.

Figure 2:
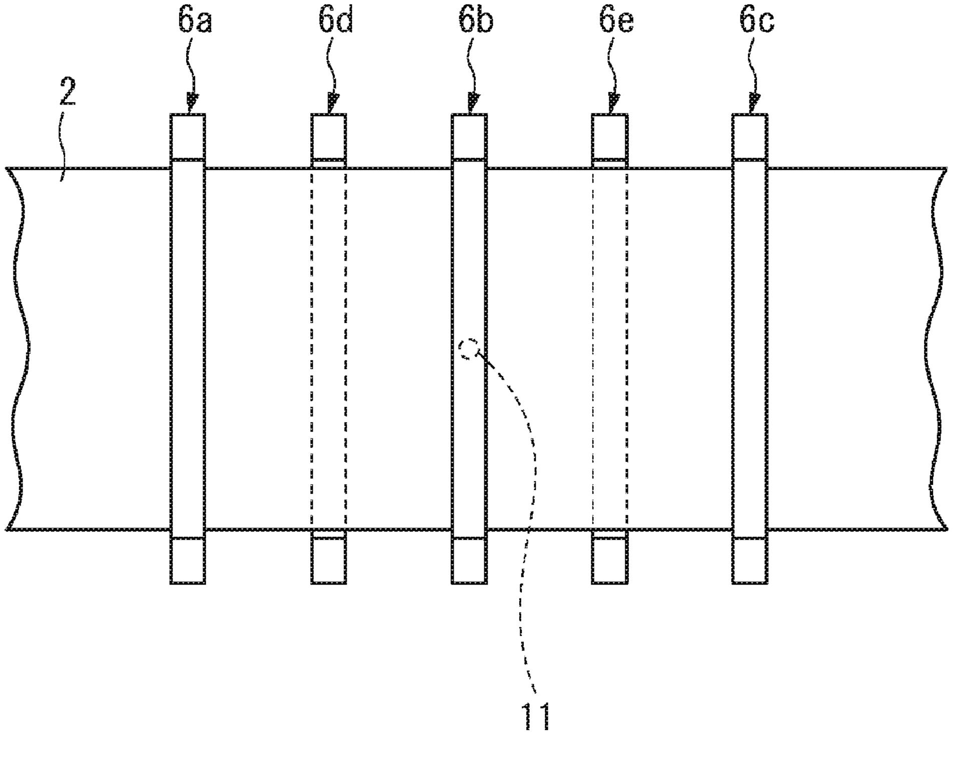
FIG. 2 is a partial plan view of the electrode sheet drying device illustrated in FIG. 1.

As seen from FIG. 1 and FIG. 2 which illustrates a plan view in the drying furnace 1, the electrode sheet 2 is in the shape of a belt with a uniform width extending in the transfer direction. In the embodiment illustrated in FIGS. 1 and 2, the electrode sheet 2 is formed as an electrode sheet for use to manufacture a lithium ion secondary battery, a nickel metal hydride battery, etc. During manufacture of such batteries, drying work is required at a variety of stages, and thus the electrode sheet 2 to be dried is in a variety of forms in accordance with the stage of manufacture. In the embodiments of the present disclosure, electrode sheets 2 in the variety of forms are collectively referred to as an "electrode sheet 2".

That is, examples of the electrode sheet 2 illustrated in FIGS. 1 and 2 include a metal foil to neither surface of which an electrode material is applied, a metal foil to one surface of which an electrode material made from a positive electrode active material or a negative electrode active material is applied and to the other surface of which no electrode material is applied, a metal foil to one surface of which an electrode material made from a positive electrode active material is applied and to the other surface of which an electrode material made from a negative electrode active material is applied, etc. In any case, the performance of the manufactured battery is significantly degraded if moisture adheres to the metal foil or moisture is contained in the electrode material. Thus, drying work for the electrode sheet 2 is required to remove moisture when manufacturing a battery, and the drying furnace 1 illustrated in FIGS. 1 and 2 is used for the drying work for the electrode sheet 2.

With reference to FIGS. 1 and 2, the drying furnace 1 includes a plurality of infrared heaters 6*a*, 6*b*, 6*c*, 6*d*, and 6*e* disposed on both sides of the electrode sheet 2. The infrared heaters 6*a*, 6*b*, and 6*c* disposed above the electrode sheet 2 and the infrared heaters 6*d* and 6*e* disposed below the electrode sheet 2 are disposed at intervals along a transfer path for the electrode sheet 2. In this case, in the example illustrated in FIGS. 1 and 2, the infrared heaters 6*a*, 6*b*, and 6*c* disposed above the electrode sheet 2 and the infrared heaters 6*d* and 6*e* disposed below the electrode sheet 2 are disposed in a staggered manner along the transfer path for the electrode sheet 2 such that the infrared heaters 6*d* and 6*e* disposed below the electrode sheet 2 are positioned between the infrared heaters 6*a*, 6*b*, and 6*c* disposed above the electrode sheet 2 when seen along the transfer path for the electrode sheet 2.

In some electrode sheet drying devices, the electrode sheet 2 may be disposed so as to extend in the vertical direction. In this case, a plurality of infrared heaters is disposed on both sides of the electrode sheet 2 with a clearance in the lateral direction from the electrode sheet 2. In the example illustrated in FIGS. 1 and 2, one lower infrared heater 6*d*, 6*e* is disposed between the upper infrared heaters 6*a* and 6*b* and infrared heaters 6*b* and 6*c* when the electrode sheet drying device is seen from above. In this case, however, a plurality of lower infrared heaters may be disposed between the upper infrared heaters 6*a* and 6*b* and infrared heaters 6*b* and 6*c* when the electrode sheet drying device is seen from above, or a plurality of upper infrared heaters may be disposed between the lower infrared heaters 6*d* and 6*e* when the electrode sheet drying device is seen from above.

Figure 3:
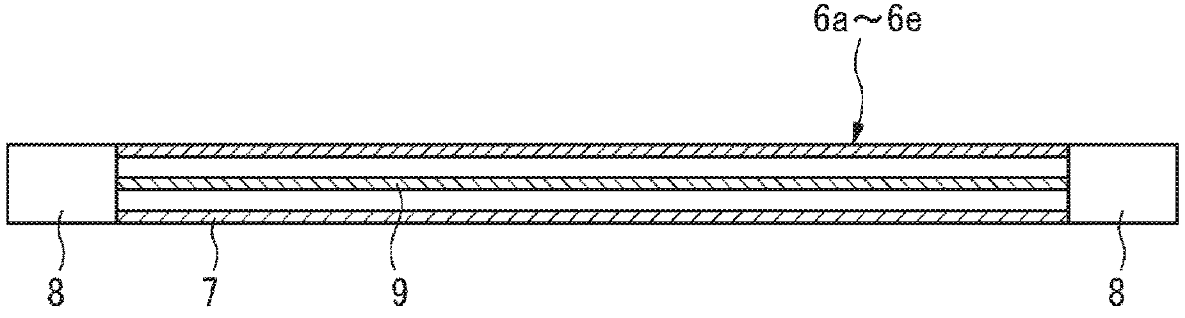
FIG. 3 is a partial sectional side view of an infrared heater.

FIG. 3 is a partial sectional side view of the infrared heater 6*a*, 6*b*, 6*c*, 6*d*, 6*e* illustrated in FIGS. 1 and 2. With reference to FIG. 3, the infrared heater 6*a*, 6*b*, 6*c*, 6*d*, 6*e* includes a hollow cylindrical quartz tube 7, end portion casings 8 attached to both end portions of the quartz tube 7, and a filament 9 disposed in the quartz tube 7 to extend from one end portion casing 8 to the other end portion casing 8. The filament 9 may be a filament that radiates infrared light with a peak wavelength of 4 μm or less, and is formed from tungsten, carbon, Kanthal, etc. Meanwhile, the quartz tube 7 may be a quartz tube that does not transmit infrared light with a wavelength of 5 μm or more. The infrared heater 6*a*, 6*b*, 6*c*, 6*d*. 6*e* illustrated in FIG. 3 is exemplary, and infrared heaters with different structures may also be used.

As illustrated in FIG. 1, the electrode sheet drying device includes an electronic control unit 10 that includes a memory composed of a read only memory (ROM) and a random access memory (RAM) and a microprocessor. The drive device 5 and the infrared heaters 6*a*, 6*b*, 6*c*, 6*d*, and 6*e* are connected to the electronic control unit 10, and controlled in accordance with an output signal from the electronic control unit 10. When power is supplied to the infrared heaters 6*a*, 6*b*, 6*c*, 6*d*, and 6*e*, infrared light is radiated from the infrared heaters 6*a*, 6*b*, 6*c*, 6*d*, and 6*e*, and the electrode sheet 2 continuously transferred in the drying furnace 1 from the roll-out roller 3 toward the roll-up roller 4 is heated by the infrared light radiated from the infrared heaters 6*a*, 6*b*, 6*c*, 6*d*, and 6*e*. The drying work for the electrode sheet 2 is performed with moisture adhering to or retained in the electrode sheet 2 removed by the heating action with the infrared light. When infrared light is radiated from the infrared heaters 6*a*, 6*b*, 6*c*, 6*d*, and 6*e*, the temperature in a surface region of the electrode sheet 2 that is the closest to the infrared heaters 6*a*, 6*b*, 6*c*, 6*d*, and 6*e* becomes the highest. While the electrode sheet 2 can be dried more effectively as the temperature of the electrode sheet 2 becomes higher in this case, the electrode sheet 2 may be thermally degraded when the temperature of the electrode sheet 2 becomes excessively high. Thus, there is an optimum value of the temperature in the highest temperature region of the electrode sheet 2.

In the example illustrated in FIG. 1, the filaments 9 of the infrared heaters 6*a*, 6*b*, 6*c*, 6*d*, and 6*e* reach a high temperature of about 2100° C., and an optimum temperature $T_0$ in the highest temperature region of the electrode sheet 2 is about 150° C., for example. The optimum temperature $T_0$ is different in accordance with the form and the drying stage of the electrode sheet 2. In order to effectively dry the electrode sheet 2 without causing a problem, it is necessary to control the temperature in the highest temperature region of the electrode sheet 2 to the optimum temperature $T_0$, and to that end, it is necessary to accurately measure the temperature in the highest temperature region of the electrode sheet 2. In this case, it is practically difficult to measure the temperature in the highest temperature region of the electrode sheet 2 being moved using a temperature sensor that directly contacts the electrode sheet 2, and it is necessary to measure the temperature in the highest temperature region of the electrode sheet 2 in a non-contact manner.

A radiation temperature sensor for low-temperature measurement that measures a temperature by detecting infrared light with a wavelength in the range of 8 μm to 14 μm is known as a sensor capable of appropriately measuring a temperature of about 150° C. in a non-contact manner, and is already available in the market. Thus, in the embodiment according to the present disclosure, the temperature in the highest temperature region of the electrode sheet 2 is detected using a radiation temperature sensor capable of measuring a temperature by detecting infrared light with a wavelength in the range of 8 μm to 14 μm in this manner. The radiation temperature sensor includes a built-in detection element that rises in temperature when absorbing infrared light to output an electrical signal that matches the temperature, for example, and measures the temperature of the surface of an object that radiates infrared light using the detection element. That is, the radiation temperature sensor is configured to measure the temperature of the surface of an object that radiates infrared light by detecting infrared light that is incident on the radiation temperature sensor.

Since the metal foil that constitutes the electrode sheet 2 has high thermal conductivity and the electrode sheet 2 has small thickness, the temperature in the highest temperature region of the electrode sheet 2 is substantially equal on both the upper and lower surfaces. Thus, in the embodiment of the present disclosure, the radiation temperature sensor 11 discussed above is disposed directly below the infrared heater 6*b* and below the electrode sheet 2, that is, on the opposite side of the infrared heater 6*b* from the electrode sheet 2, to measure the temperature in the highest temperature region of the electrode sheet 2 that has been subjected to the heating action of the infrared heater 6*b*, for example. The radiation temperature sensor 11 can be disposed in this manner, since the infrared heaters 6*a*, 6*b*, and 6*c* disposed above the electrode sheet 2 and the infrared heaters 6*d* and 6*e* disposed below the electrode sheet 2 are disposed in a staggered manner along the transfer path for the electrode sheet 2. In the example illustrated in FIG. 1, the infrared heater 6*b* and the radiation temperature sensor 11 are disposed on the same vertical line that is perpendicular to the surface of the electrode sheet 2. In this case, the upper surface of the radiation temperature sensor 11 serves as an infrared intake port 11*a*. When the radiation temperature sensor 11 is disposed in this manner, it is possible to reliably measure the temperature of the back surface of the electrode sheet 2 corresponding to the back side of a front surface portion of the electrode sheet 2 that is the closest to the infrared heater 6*b*, even if the electrode sheet 2 is displaced in the up-down direction.

As discussed earlier, the quartz tube 7 that does not transmit infrared light with a wavelength of 5 μm or more is used as the quartz tube 7 that surrounds the filament 9 of the infrared heaters 6*a*, 6*b*, 6*c*, 6*d*, and 6*e*. Thus, infrared light radiated from the filament 9 to pass through the quartz tube 7 is infrared light with a wavelength of 5 μm or less. As discussed earlier, however, the filaments 9 of the infrared heaters 6*a*, 6*b*, 6*c*, 6*d*, and 6*e* reach a high temperature of about 2100° C., and at this time, the quartz tube 7 reaches a temperature of about 700° C. When the quartz tube 7 reaches a high temperature in this manner, infrared light is radiated from the quartz tube 7 itself, and at this time, infrared light with a wavelength of 5 μm or more is radiated from the quartz tube 7. When this infrared light is incident on the infrared intake port $\mathbf{11}_a$ of the radiation temperature sensor 11, the infrared light acts as disturbances to cause erroneous detection by the radiation temperature sensor 11.

When infrared light radiated from the infrared heaters 6*a*, 6*b*, 6*c*, 6*d*, and 6*e* is reflected by the furnace wall of the drying furnace 1 or the surface of the electrode sheet 2 and the reflected infrared light is incident on the radiation temperature sensor 11, in addition, the infrared light acts as disturbances to cause erroneous detection by the radiation temperature sensor 11. Thus, in the embodiment of the present disclosure, in order to suppress such erroneous detection as much as possible, the peak wavelength of infrared light radiated to the surface of the electrode sheet 2 by the infrared heaters 6*a*, 6*b*, 6*c*, 6*d*, and 6*e* and the detectable wavelength range of infrared light detected by the radiation temperature sensor 11 are set such that the peak wavelength of infrared light radiated to the surface of the electrode sheet 2 by the infrared heaters 6*a*, 6*b*, 6*c*, 6*d*, and 6*e* is not included in the detectable wavelength range of infrared light detected by the radiation temperature sensor 11. In this case, in the embodiment of the present disclosure, the peak wavelength of infrared light radiated from the infrared heaters 6*a*, 6*b*, 6*c*, 6*d*, and 6*e* is set to 4 μm or less, and the detectable wavelength range of infrared light is set in the range of 8 μm to 14 μm.

In the embodiment of the present disclosure, in this manner, the electrode sheet drying device that dries the electrode sheet 2 transferred along the transfer path includes the infrared heater 6*b* disposed on one side of the electrode sheet 2 and the radiation temperature sensor 11 disposed on the other side of the electrode sheet 2, the radiation temperature sensor 11 is disposed to be able to measure the temperature of the back surface of the electrode sheet 2 corresponding to the back side of a front surface portion of the electrode sheet 2 that is the closest to the infrared heater 6*b*, and the peak wavelength of infrared light radiated to the surface of the electrode sheet 2 by the infrared heaters 6*a*, 6*b*, 6*c*, 6*d*, and 6*e* is not included in the detectable wavelength range of infrared light detected by the radiation temperature sensor 11.

Figure 4:
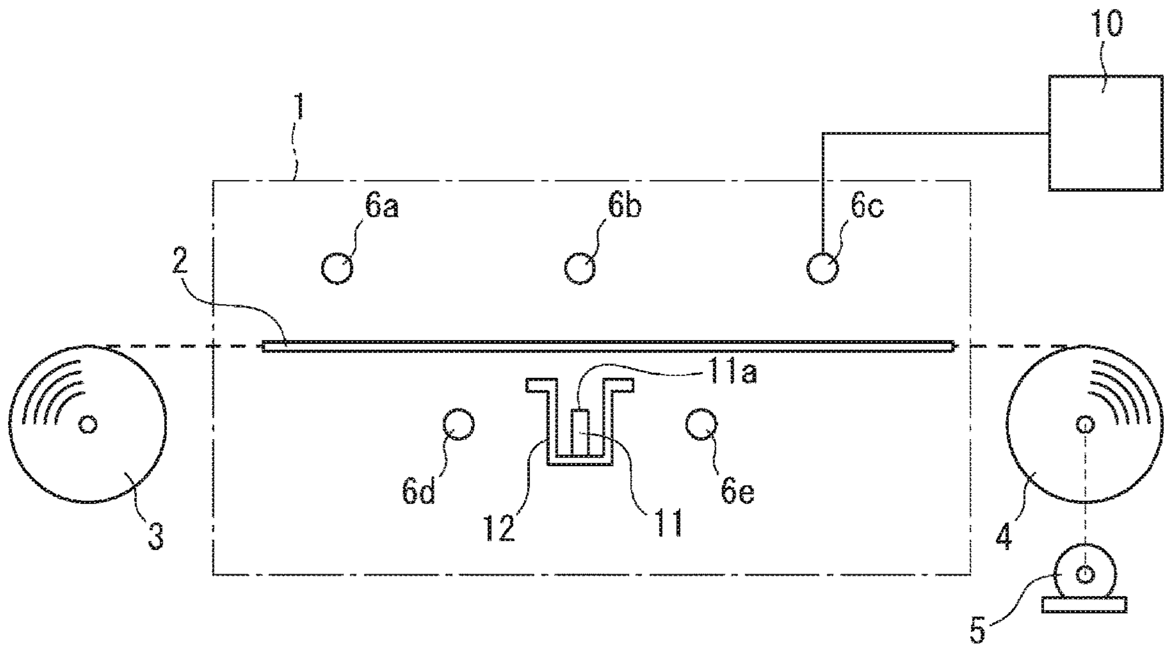
FIG. 4 is a side view diagrammatically illustrating an electrode sheet drying device according to a second embodiment.

Next, an electrode sheet drying device according to a second embodiment will be described with reference to FIG. 4. In the second embodiment, with reference to FIG. 4, the radiation temperature sensor 11 is disposed in a housing 12 covered by a peripheral wall that does not transmit infrared light, in order to further avoid incidence of infrared light reflected by the furnace wall or the surface of the electrode sheet 2 on the radiation temperature sensor 11. The housing 12 opens upward to allow infrared light, radiated from the back surface of the electrode sheet 2 corresponding to the back side of a front surface portion of the electrode sheet 2 that is the closest to the infrared heater 6*b*, to be incident on the infrared intake port 11*a* of the radiation temperature sensor 11. The peripheral wall of the housing 12 is preferably formed from a heat insulating material.

When the radiation temperature sensor 11 is disposed in the housing 12 in this manner, incidence of infrared light reflected by the furnace wall or the surface of the electrode sheet 2 on the infrared intake port 11*a* of the radiation temperature sensor 11 is suppressed. That is, incidence of infrared light that acts as disturbances in the detectable wavelength range of the radiation temperature sensor 11 on the infrared intake port 11*a* of the radiation temperature sensor 11 is suppressed. As a result, it is possible to continuously measure the temperature in the highest temperature region of the electrode sheet 2 being moved appropriately.

Next, an electrode sheet drying device according to a third embodiment will be described with reference to FIGS. 5 and 6. In the third embodiment, a variety of contrivances are further made, in order to further avoid incidence of infrared light reflected by the furnace wall or the surface of the electrode sheet 2 on the radiation temperature sensor 11. In the third embodiment, with reference to FIGS. 5 and 6, window members 13*a*, 13*b*, 13*c*, 13*d*, and 13*e* that do not transmit infrared light with a wavelength of 5 μm or more are disposed between the infrared heaters 6*a*, 6*b*, 6*c*, 6*d*, and 6*e*, respectively, and the electrode sheet 2. The window members 13*a*, 13*b*, 13*c*, 13*d*, and 13*e* are formed from quartz glass or tempered glass that does not transmit infrared light with a wavelength of 5 μm or more.

Figure 5:
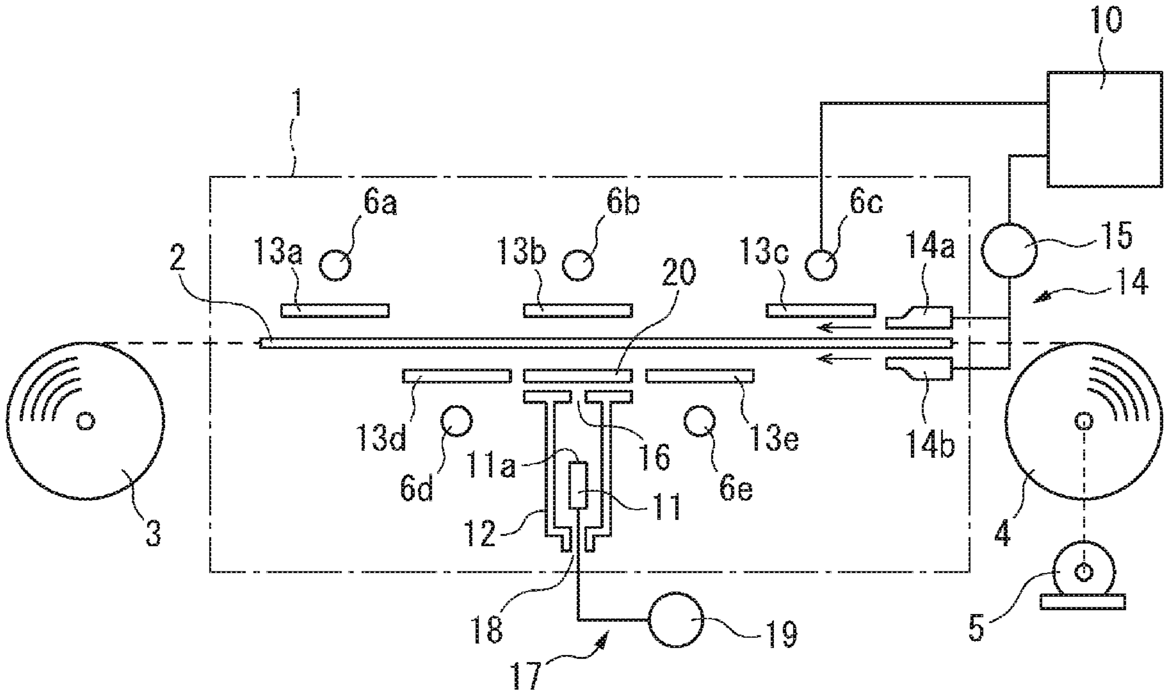
FIG. 5 is a side view diagrammatically illustrating an electrode sheet drying device according to a third embodiment.

In the example illustrated in FIG. 5, the window members 13*a*, 13*b*, 13*c*, 13*d*, and 13*e* are formed in the shape of thin flat plates disposed in parallel with the electrode sheet 2 with a clearance from the electrode sheet 2, and formed in the shape of rectangles extending over the overall length of the electrode sheet 2 in the width direction and extending for the same length in the transfer direction of the electrode sheet 2 and the opposite direction from the corresponding infrared heaters 6*a*, 6*b*, 6*c*, 6*d*, and 6*e*. The window members 13*a*. 13*b*, 13*c*, 13*d*, and 13*e* also serve to suppress contact of the electrode sheet 2 with the infrared heaters 6*a*, 6*b*, 6*c*, 6*d*, and 6*e*, respectively.

As illustrated in FIG. 5, the drying furnace 1 includes an air blowing device 14 that blows dry air with a dew point of −40° C. or less, for example, along the upper and lower surfaces of the electrode sheet 2. In the embodiment illustrated in FIG. 5, the air blowing device 14 includes a pair of nozzles 14*a* and 14*b* provided at the downstream end portion of the electrode sheet 2 in the drying furnace 1 to blow out dry air toward the upstream side of the electrode sheet 2 along the upper and lower surfaces, respectively, of the electrode sheet 2, and an air blower 15 that feeds dry air to the nozzles 14*a* and 14*b*. As illustrated in FIG. 6, the nozzle 14*a* extends over the overall length of the electrode sheet 2 in the width direction. Likewise, the nozzle 14*b* extends over the overall length of the electrode sheet 2 in the width direction. The air blower 15 is connected to the electronic control unit 10 so that operation of the air blower 15 is controlled in accordance with an output signal from the electronic control unit 10.

Moisture removed from the electrode sheet 2 is carried away and the window members 13*a*, 13*b*, 13*c*, 13*d*, and 13*e* are cooled by the dry air distributed from the nozzles 14*a* and 14*b* toward the upstream side of the electrode sheet 2 along the upper and lower surfaces of the electrode sheet 2. While the air blowing device 14 is not provided in the first embodiment illustrated in FIG. 1 and the second embodiment illustrated in FIG. 4, the air blowing device 14 illustrated in FIG. 5 may also be provided in the first embodiment illustrated in FIG. 1 and the second embodiment illustrated in FIG. 4.

In the example illustrated in FIG. 5, the upper part of the housing 12 is covered by a top wall, and an opening 16 is formed in the top wall to allow infrared light radiated from the back surface of the electrode sheet 2 corresponding to the back side of a front surface portion of the electrode sheet 2 that is the closest to the infrared heater 6*b* to be incident on the infrared intake port 11*a* of the radiation temperature sensor 11. That is, in the example illustrated in FIG. 5, not only the infrared heater 6*b* and the radiation temperature sensor 11 but also the opening 16 is disposed on the same vertical line that is perpendicular to the surface of the electrode sheet 2. In the example illustrated in FIG. 5, in addition, a cooling device 17 is installed to feed cooling air into the housing 12 to cool the inner wall surface of the housing 12 and the radiation temperature sensor 11. The cooling device 17 includes a cooling air inflow port 18 that opens into the housing 12 and an air blower 19 that feeds cooling air to the cooling air inflow port 18. The inner wall surface of the housing 12 and the radiation temperature sensor 11 are cooled by cooling air fed into the housing 12 through the cooling air inflow port 18. The air blower 19 is connected to the electronic control unit 10 so that operation of the air blower 19 is controlled in accordance with an output signal from the electronic control unit 10.

An infrared cut filter 20 is disposed between the opening 16 formed in the top wall of the housing 12 and the electrode sheet 2 to cut infrared light with a wavelength shorter than the detectable wavelength range of the radiation temperature sensor 11, e.g. infrared light with a wavelength of 5 μm or less. The infrared cut filter 20 is prepared using $CaF_2$, $BaF_2$, etc. In the example illustrated in FIG. 5, the infrared cut filter 20 is also formed in the shape of a thin flat plate disposed in parallel with the electrode sheet 2 with a clearance from the electrode sheet 2, and formed in the shape of a rectangle extending over the overall length of the electrode sheet 2 in the width direction and extending for the same length in the transfer direction of the electrode sheet 2 and the opposite direction from the opening 16. The infrared cut filter 20 illustrated in FIG. 5 is merely exemplary, and it is only necessary that the infrared cut filter 20 should cover at least the opening 16 of the housing 12.

Figure 6:
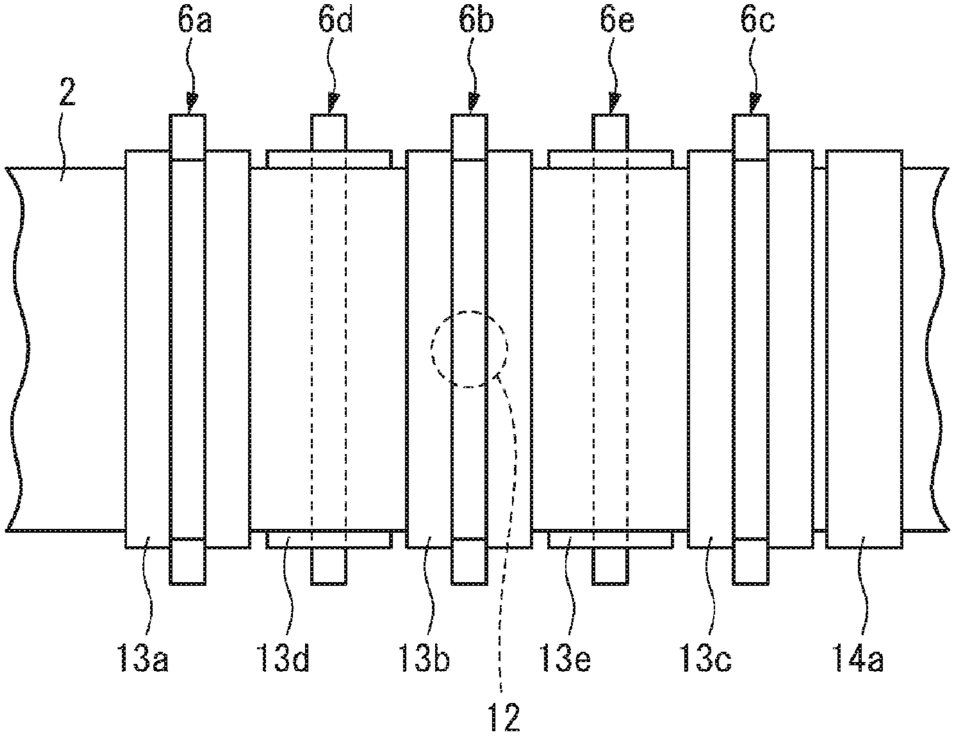
FIG. 6 is a partial plan view of the electrode sheet drying device illustrated in FIG. 5.

In the third embodiment illustrated in FIGS. 5 and 6, infrared light with a wavelength of 5 μm or more radiated from the quartz tube 7 itself is blocked by the window members 13*a*, 13*b*, 13*c*, 13*d*, and 13*e*. Since the window members 13*a*, 13*b*, 13*c*, 13*d*, and 13*e* are cooled by dry air, the window members 13*a*, 13*b*, 13*c*, 13*d*, and 13*e* themselves do not radiate strong infrared light with a wavelength of 5 μm or more. Thus, reflection of infrared light with a wavelength of 5 μm or more by the surface of the electrode sheet 2 is suppressed, and incidence of infrared light with a wavelength of 5 μm or more reflected by the surface of the electrode sheet 2, that is, infrared light that acts as disturbances in the detectable wavelength range of the radiation temperature sensor 11, on the infrared intake port 11*a* of the radiation temperature sensor 11 is suppressed.

A part of infrared light with a wavelength of 5 μm or less having reached the surface of the electrode sheet 2 is reflected by the surface of the electrode sheet 2 to heat surrounding structures such as the furnace wall. Since the inside of the drying furnace 1 is cooled by dry air, however, strong infrared light with a wavelength of 5 μm or more is not radiated from surrounding structures such as the furnace wall, and thus incidence of infrared light that acts as disturbances in the detectable wavelength range of the radiation temperature sensor 11 on the infrared intake port 11*a* of the radiation temperature sensor 11 is suppressed.

When infrared light with a wavelength of 5 μm or less reflected by the surface of the electrode sheet 2 is incident into the housing 12 through the opening 16 formed in the top wall of the housing 12, the inner wall surface of the housing 12 is heated by the infrared light. Since the infrared cut filter 20 that cuts infrared light with a wavelength shorter than the detectable wavelength range of the radiation temperature sensor 11, e.g. infrared light with a wavelength of 5 μm or less, is disposed between the opening 16 and the electrode sheet 2, however, incidence of infrared light with a wavelength of 5 μm or less reflected by the surface of the electrode sheet 2 into the housing 12 is hindered. Further, the inner wall surface of the housing 12 is cooled by cooling air that flows in through the cooling air inflow port 18. Thus, strong infrared light with a wavelength of 5 μm or more is not radiated from the inner wall surface of the housing 12, and thus incidence of infrared light that acts as disturbances in the detectable wavelength range of the radiation temperature sensor 11 on the infrared intake port 11*a* of the radiation temperature sensor 11 is suppressed. In addition, the infrared cut filter 20 is cooled by cooling air that flows out of the opening 16. Thus, strong infrared light with a wavelength of 5 μm or more is not radiated from the infrared cut filter 20, and thus incidence of infrared light that acts as disturbances in the detectable wavelength range of the radiation temperature sensor 11 on the infrared intake port 11*a* of the radiation temperature sensor 11 is suppressed. When a metal foil is used as the electrode sheet 2, a carbon coating layer may be formed on the metal foil to suppress reflection of infrared light by the surface of the electrode sheet 2.

In the third embodiment, in this manner, incidence of infrared light that acts as disturbances in the detectable wavelength range of the radiation temperature sensor 11 on the infrared intake port 11*a* of the radiation temperature sensor 11 is suppressed. Thus, in the third embodiment, it is possible to continuously measure the temperature in the highest temperature region of the electrode sheet 2 being moved more accurately using the radiation temperature sensor 11.

Figure 7:
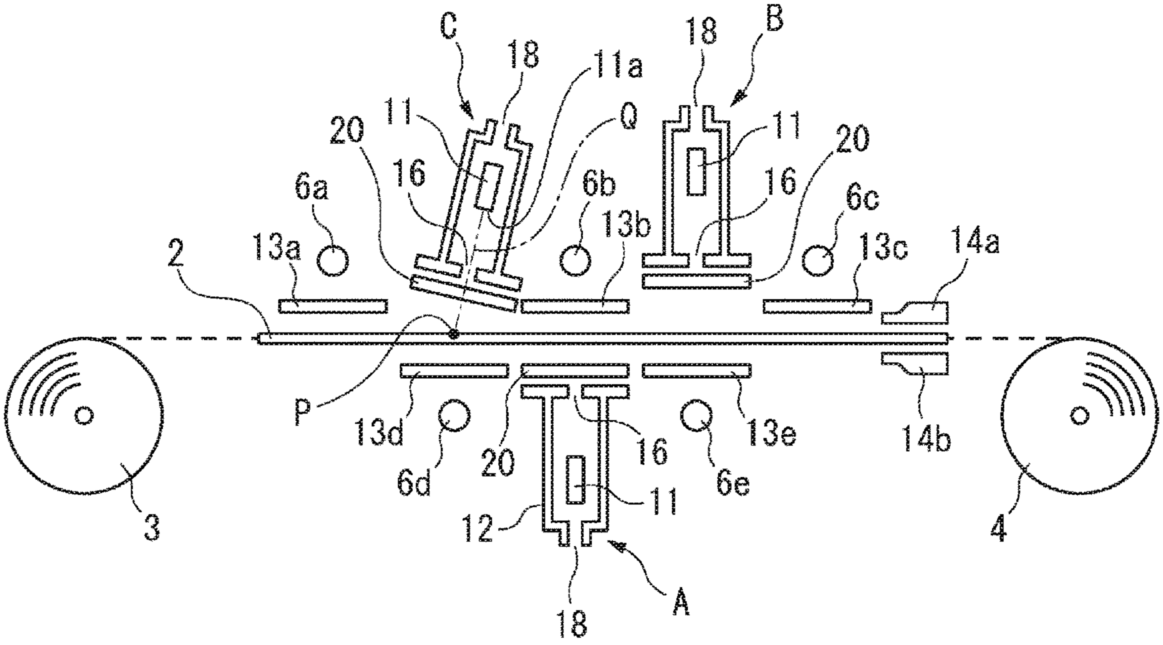
FIG. 7 is a side view illustrating a modification of the electrode sheet drying device illustrated in FIG. 5.
Figure 8:
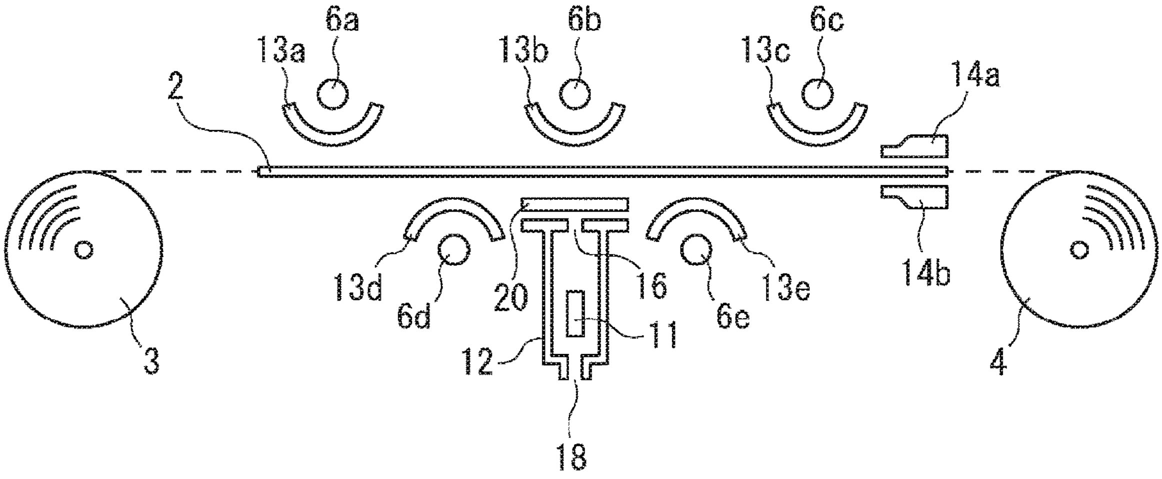
FIG. 8 is a side view illustrating a modification of the electrode sheet drying device illustrated in FIG. 5.

FIGS. 7 and 8 illustrate modifications of the third embodiment illustrated in FIG. 5. First, with reference to the modification illustrated in FIG. 7, a temperature detector B and a temperature detector C are installed above the electrode sheet 2 in the modification, in addition to a temperature detector A composed of the radiation temperature sensor 11, the housing 12, the opening 16, the cooling air inflow port 18, and the infrared cut filter 20 that are similar to those according to the third embodiment illustrated in FIG. 5. As seen from FIG. 7, the temperature detector B and the temperature detector C have the same structure as the temperature detector A, and the infrared cut filter 20 is disposed so as to cover the opening 16.

In the modification illustrated in FIG. 7, the temperature detector B is disposed such that the radiation temperature sensor 11 measures the temperature of the upper surface of the electrode sheet 2 corresponding to the back side of a front surface portion of the electrode sheet 2 that is the closest to the infrared heater 6*e*, and the temperature detector C is disposed such that the radiation temperature sensor 11 measures the temperature of the upper surface of the electrode sheet 2 corresponding to the back side of a front surface portion of the electrode sheet 2 that is the closest to the infrared heater 6*d*. In this case, for the temperature detector B, the infrared heater 6*e* and the radiation temperature sensor 11 are disposed on the same vertical line that is perpendicular to the surface of the electrode sheet 2. For the temperature detector C, on the contrary, the housing 12 is disposed to be inclined with respect to the vertical line that is perpendicular to the surface of the electrode sheet 2 so as to be able to measure the highest temperature of the electrode sheet 2. That is, for the temperature detector C, the housing 12 is disposed to be inclined such that a line Q that passes through the infrared intake port 11*a* of the radiation temperature sensor 11 and the opening 16 of the housing 12 passes through a highest temperature point P on the upper surface of the electrode sheet 2. In this manner, a plurality of temperature detectors A, B, and C is disposed as necessary on both sides of the electrode sheet 2.

Next, with reference to the modification illustrated in FIG. 8, the window members 13*a*, 13*b*, 13*c*, 13*d*, and 13*e* disposed between the infrared heaters 6*a*, 6*b*, 6*c*, 6*d*, and 6*e*, respectively, and the electrode sheet 2 are curved around the corresponding infrared heaters 6*a*, 6*b*, 6*c*, 6*d*, and 6*e* in the modification. The window members 13*a*, 13*b*, 13*c*, 13*d*, and 13*e* also extend over the overall length of the electrode sheet 2 in the width direction, and are formed from quartz glass or tempered glass that does not transmit infrared light with a wavelength of 5 μm or more.

When it is attempted to continuously measure the temperature in the highest temperature region of the electrode sheet 2 being moved using the radiation temperature sensor 11 in this manner, there actually occurs a deviation between the measured temperature and the actual temperature. In this case, a problem may be caused when the amount of the deviation is significant, while no special problem may be caused when the amount of the deviation is small. Thus, a temperature estimation method configured to resolve the deviation between the measured temperature and the actual temperature and control for drying the electrode sheet 2 based on the temperature estimation method will be described next using the electrode sheet drying device illustrated in FIG. 5 as an example.

Figures 9, 10:
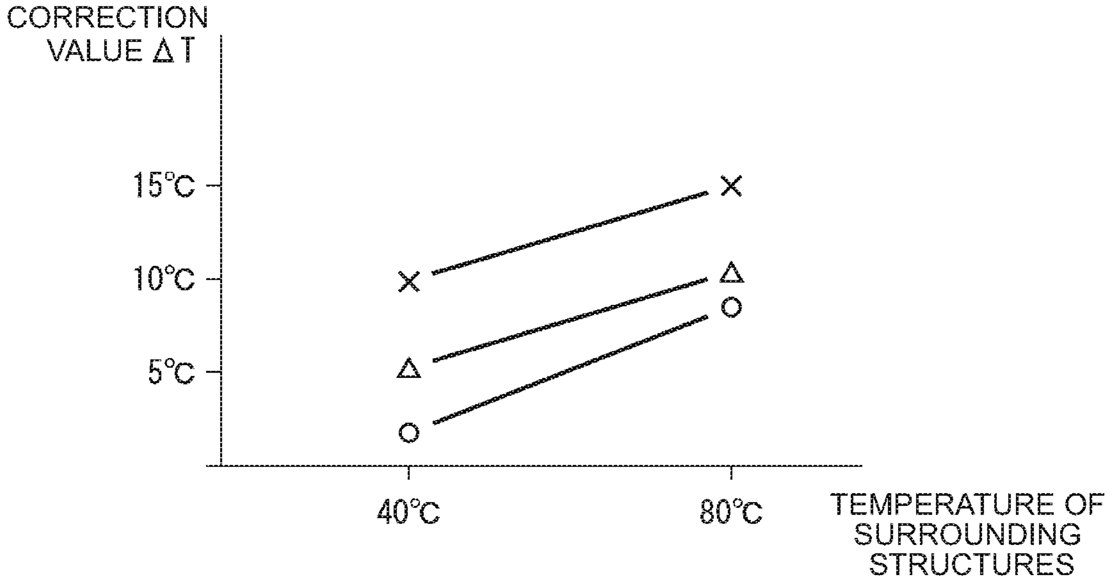
FIG. 9 illustrates an example of a correction value ΔT.
FIG. 10 illustrates a list of the correction value ΔT.

FIGS. 9 and 10 illustrate an example of a temperature estimation method in which a correction value ΔT that indicates the amount of deviation between the measured temperature and the actual temperature is calculated in advance and the temperature in the highest temperature region of the electrode sheet 2 is estimated using the correction value ΔT. FIG. 9 illustrates the relationship between the correction value ΔT (vertical axis) that indicates the temperature difference between the actual temperature in the highest temperature region of the electrode sheet 2 and the temperature measured by the radiation temperature sensor 11 and the average temperature (horizontal axis) of structures such as various members and the furnace wall around the radiation temperature sensor 11. In acquiring this relationship, the temperature in the highest temperature region of the electrode sheet 2 is measured by a direct contact thermocouple, for example. In FIG. 9, x marks indicate a case where the electrode sheet 2 is made of a solid metal foil, triangular marks indicate a case where a carbon coating layer is formed on a metal foil, and round marks indicate a case where an electrode material layer is formed on a metal foil.

It is seen from FIG. 9 that the correction value ΔT that indicates the temperature difference between the actual temperature and the temperature measured by the radiation temperature sensor 11 is varied in accordance with the form (a solid metal foil, a metal foil with a carbon coating layer, a metal foil with an electrode material layer, etc.) of the electrode sheet 2 and the temperature of structures such as various members and the furnace wall around the radiation temperature sensor 11. Thus, in the temperature estimation method, correction values $\Delta T_{11}$, $\Delta T_{12}$, . . . for temperature ranges ($T_1$–$T_2$, $T_2$–$T_3$, . . . ) for a temperature TX of the furnace wall and temperature ranges ($T_1$–$T_2$, $T_2$–$T_3$, . . . ) for a temperature TY of the window member 13*a*, 13*b*, 13*c*, 13*d*, or 13*e* are calculated in advance through experiments for each form of the electrode sheet 2, preparing a list such as that illustrated in FIG. 10.

While the temperature TX of the furnace wall and the temperature TY of the window member 13*a*, 13*b*, 13*c*, 13*d*, or 13*e* are used as temperature factors that affect the correction value ΔT in FIG. 10, there are other temperature factors that affect the correction value ΔT. Thus, in practice, a multi-dimensional list of the correction value ΔT is prepared in the form of a function of multiple temperature factors including the temperature TX of the furnace wall and the temperature TY of the window member 13*a*, 13*b*, 13*c*, 13*d*, or 13*e*, and the temperature in the highest temperature region of the electrode sheet 2 being moved is estimated using the multi-dimensional list of the correction value ΔT. The multi-dimensional list of the correction value ΔT is stored in the memory of the electronic control unit 10.

Figure 11:
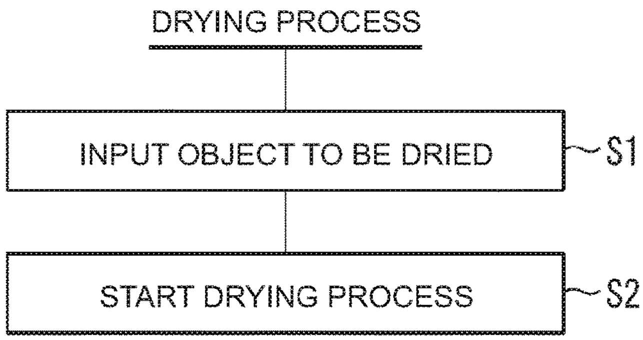
FIG. 11 illustrates the procedures of a drying process.

Next, the procedures of a drying process for the electrode sheet 2 by the electrode sheet drying device will be described with reference to FIG. 11. With reference to FIG. 11, an object to be dried, that is, the form of the electrode sheet 2, is input to the electronic control unit 10 as indicated in S1. When an object to be dried is input to the electronic control unit 10, a drying process for the electrode sheet 2 is started as indicated in S2. When a drying process for the electrode sheet 2 is started, the electronic control unit 10 executes a drying control routine for the electrode sheet 2 illustrated in FIG. 12 by interruption at constant intervals.

Figure 12:
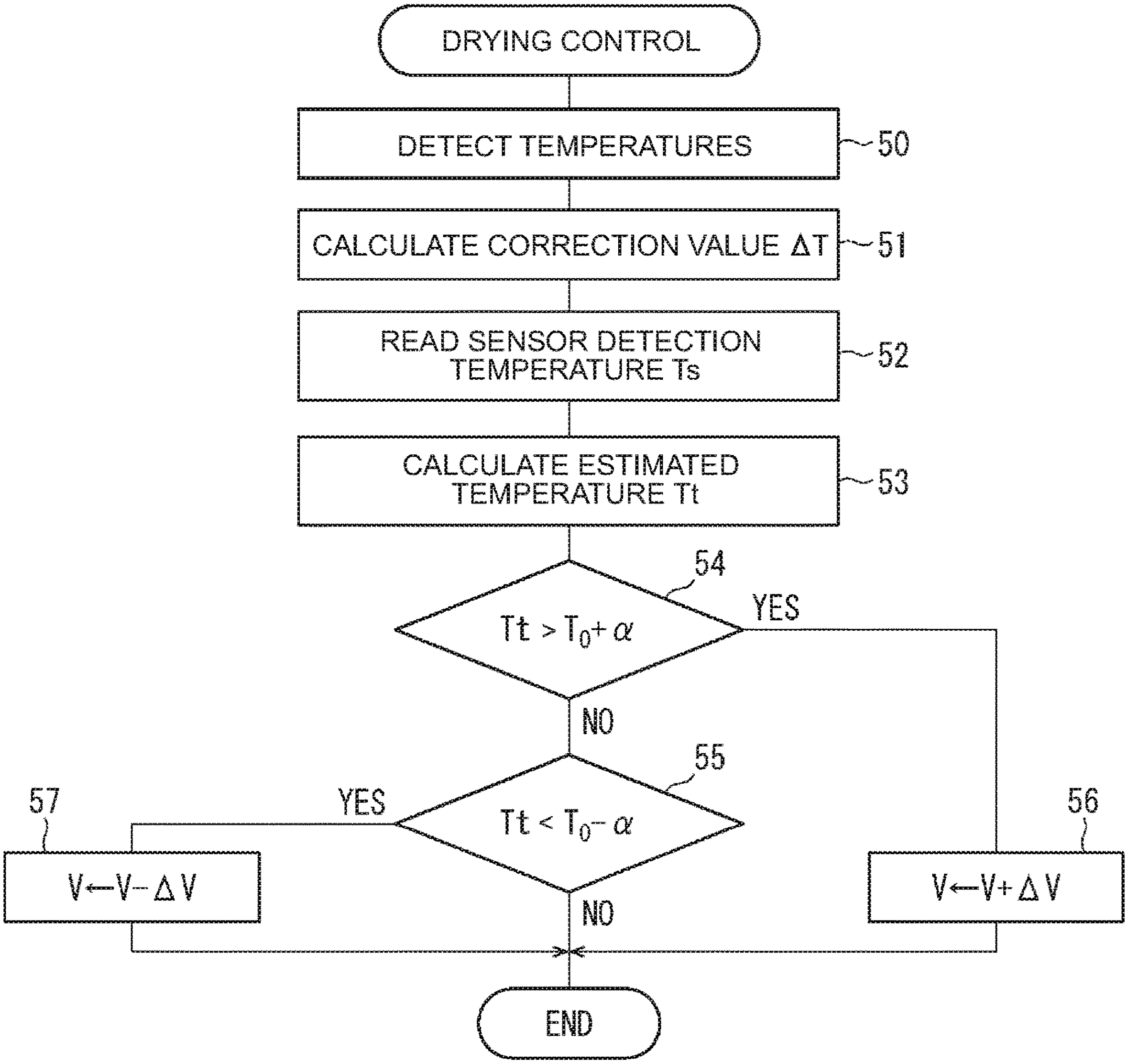
FIG. 12 is a flowchart for drying control.

With reference to FIG. 12, first, in step 50, a temperature sensor detects multiple temperature factors including the temperature TX of the furnace wall and the temperature TY of the window member 13*a*, 13*b*, 13*c*, 13*d*, or 13*e*. Then, in step 51, a correction value ΔT is calculated from the multiple temperature factors, including the temperature TX of the furnace wall and the temperature TY of the window member 13*a*, 13*b*, 13*c*, 13*d*, or 13*e*, based on a multi-dimensional list of the correction value ΔT stored in the memory of the electronic control unit 10. Then, in step 52, a sensor detection temperature Ts measured by the radiation temperature sensor 11 is read. Then, in step 53, an estimated temperature Tt in the highest temperature region of the electrode sheet 2 is calculated by subtracting the correction value ΔT from the sensor detection temperature Ts.

Then, in step 54, it is determined whether the estimated temperature Tt in the highest temperature region of the electrode sheet 2 is more than a value $T_0+\alpha$ obtained by adding a small constant value α to an optimum temperature $T_0$ in the highest temperature region of the electrode sheet 2. When it is determined that the estimated temperature Tt is more than $T_0+\alpha$, the process proceeds to step 56, where drive control for the drive device 5 is performed so as to increase a transfer speed V of the electrode sheet 2 by ΔV. When the transfer speed V of the electrode sheet 2 is increased, the temperature in the highest temperature region of the electrode sheet 2 is lowered.

When it is determined in step 54 that the estimated temperature Tt is not more than $T_0+\alpha$, on the other hand, the process proceeds to step 55, where it is determined whether the estimated temperature Tt in the highest temperature region of the electrode sheet 2 is less than a value $T_0-\alpha$ obtained by subtracting the constant value α from the optimum temperature $T_0$ in the highest temperature region of the electrode sheet 2. When it is determined that the estimated temperature Tt is less than $T_0-\alpha$, the process proceeds to step 57, where drive control for the drive device 5 is performed so as to decrease the transfer speed V of the electrode sheet 2 by ΔV. When the transfer speed V of the electrode sheet 2 is decreased, the temperature in the highest temperature region of the electrode sheet 2 is raised. In this manner, the temperature in the highest temperature region of the electrode sheet 2 is controlled to the optimum temperature $T_0$.

Figures 13, 14:
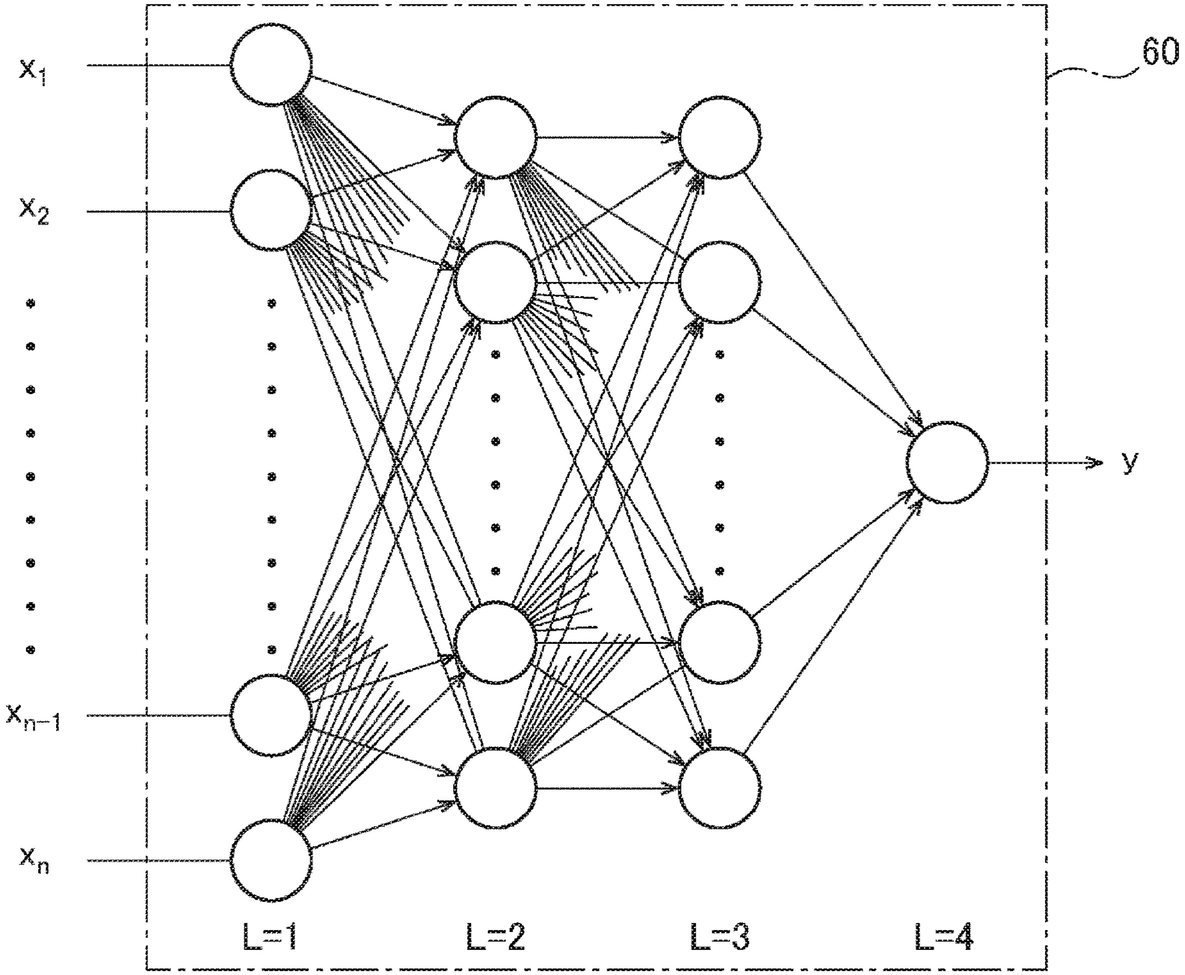
FIG. 13 illustrates a neural network.
FIG. 14 illustrates a list of training data sets.

FIGS. 13 and 14 illustrate another example of a temperature estimation method in which the temperature in the highest temperature region of the electrode sheet 2 is estimated based on the temperature measured by the radiation temperature sensor 11 and multiple temperature factors including the temperature of the furnace wall or the window member 13*a*. 13*b*, 13*c*, 13*d*, or 13*e* etc. using a neural network. FIG. 13 illustrates a neural network 60. With reference to FIG. 13, in the neural network 60, L=1 indicates an input layer, L=2 and L=3 indicate hidden layers, and L=4 indicates an output layer. FIG. 13 also indicates input values $x_1, x_2, \ldots, x_{n-1}$, and $x_n$ of input parameters to be input to respective nodes in the input layer (L=1) and an output value y to be output from the node in the output layer (L=4).

FIG. 14 illustrates a training data set prepared using the input values $x_1, x_2, \ldots, x_{n-1}$, and $x_n$ of the input parameters and teacher data, that is, a correct answer label $y_t$, in order to learn weighting of the neural network 60. In the training data set illustrated in FIG. 14, m data of No. 1 to No. m are given, and the training data set is prepared for each form (a solid metal foil, a metal foil with a carbon coating layer, a metal foil with an electrode material layer, etc.) of the electrode sheet 2. The input parameters include the temperature measured by the radiation temperature sensor 11 in addition to multiple temperature factors including the temperature of the furnace wall or the window member 13*a*, 13*b*, 13*c*, 13*d*, or 13*e* etc., and an estimated value of the temperature in the highest temperature region of the electrode sheet 2 is used as the output value y.

By way of example, examples of the input values $x_1, x_2, \ldots, x_{n-1}$, and $x_n$ of the input parameters for data No. 1 to No. m in the training data set include actually measured values of the temperature of the furnace wall at the time when the temperature of dry air blown out of the nozzles 14*a* and 14*b* and the temperature of cooling air fed from the cooling air inflow port 18 into the housing 12 are varied, actually measured values of the temperature of the window member 13*a*, 13*b*, 13*c*, 13*d*, or 13*e*, actually measured values of the temperature of the quartz tubes 7 of the infrared heaters 6*a*, 6*b*, 6*c*, 6*d*, and 6*e*, actually measured values of the temperature of the inner wall surface of the housing 12, actually measured values of the temperature of dry air blown out of the nozzles 14*a* and 14*b*, actually measured values of the temperature of cooling air fed from the cooling air inflow port 18 into the housing 12, actually measured values of the temperature of the infrared cut filter 20, actually measured values of the transfer speed of the electrode sheet 2, actually measured values of the temperature in the drying furnace 1, actually measured values of the humidity in the drying furnace 1, actually measured values of the atmospheric pressure, and values measured by the radiation temperature sensor 11, and the teacher data, that is, the correct answer label $y_t$, for data No. 1 to No. m in the training data set are actually measured values of the temperature in the highest temperature region of the electrode sheet 2 at this time.

Next, a method of learning weighting of the neural network 60 using the training data set will be briefly described. The neural network 60 is prepared in the electronic control unit 10, and learning of weighting of the neural network 60 is performed in the electronic control unit 10. For example, input values $x_1, \ldots$, and $x_n$ for the first data (No. 1) in the training data set are input to the respective nodes in the input layer (L=1) of the neural network 60. At this time, an output value y is output from the node in the output layer (L=4) of the neural network 60. Then, a squared error $E=\frac{1}{2}(y-y_t)^2$ that indicates the error between the output value y and the correct answer label $y_t$ is calculated, and learning of weighting of the neural network 60 is performed using backpropagation such that the squared error E becomes smaller.

When learning of weighting of the neural network 60 based on the first data (No. 1) in the training data set is completed, learning of weighting of the neural network 60 based on the second data (No. 2) in the training data set is performed using backpropagation. Likewise, learning of weighting of the neural network 60 is performed sequentially up to the m-th data (No. m) in the training data set. The learning of weighting of the neural network 60 is repeatedly performed until the squared error E becomes a set error set in advance or less, and finally a highest temperature model that estimates the temperature in the highest temperature region of the electrode sheet 2 is prepared by the neural network 60 in the electronic control unit 10. When the input values $x_1, x_2, \ldots, x_{n-1}$, and $x_n$ of the input parameters actually measured are input to the electronic control unit 10 during drying work for the electrode sheet 2, an estimated value of the temperature in the highest temperature region of the electrode sheet 2 is output using the highest temperature model. When the neural network 60 is used, the estimated value is used as the estimated temperature Tt in the drying control routine for the electrode sheet 2 illustrated in FIG. 12.

In this manner, in the method of estimating the temperature in the highest temperature region of the electrode sheet 2 illustrated in FIGS. 9 and 10 and the method of estimating the temperature in the highest temperature region of the electrode sheet 2 illustrated in FIGS. 13 and 14, various temperatures including the temperature of structures around the radiation temperature sensor 11 that affects values measured by the radiation temperature sensor 11 are detected, and the temperature of the back surface of the electrode sheet corresponding to the back side of a front surface portion of the electrode sheet 2 that is the closest to the infrared heater is estimated based on detected values of the various temperatures including the temperature of structures around the radiation temperature sensor 11.

What is claimed is:

1. An electrode sheet drying device that dries an electrode sheet transferred along a transfer path, comprising:

an infrared heater disposed on one side of the electrode sheet; and a radiation temperature sensor disposed on the other side of the electrode sheet, wherein the radiation temperature sensor is disposed to be able to measure a temperature of a back surface of the electrode sheet corresponding to a back side of a front surface portion of the electrode sheet that is closest to the infrared heater, and configured such that a peak wavelength of infrared light radiated to a surface of the electrode sheet by the infrared heater is not included in a detectable wavelength range of the infrared light detected by the radiation temperature sensor, wherein the radiation temperature sensor is disposed in a housing that includes a peripheral wall that does not transmit the infrared light, and the housing has an opening that allows infrared light radiated from the back surface of the electrode sheet corresponding to the back side of the front surface portion of the electrode sheet that is the closest to the infrared heater to be incident on the radiation temperature sensor.

2. The electrode sheet drying device according to claim 1, wherein the infrared heater and the radiation temperature sensor are disposed on the same vertical line that is perpendicular to the surface of the electrode sheet.

3. The electrode sheet drying device according to claim 1, wherein the peak wavelength of the infrared light radiated from the infrared heater is 4 μm or less, and the detectable wavelength range of the infrared light detected by the radiation temperature sensor is 8 μm to 14 μm.

4. The electrode sheet drying device according to claim 1, wherein the infrared heater includes a hollow cylindrical quartz glass tube that extends in a width direction of the electrode sheet, and a filament disposed in the quartz glass tube to radiate infrared light, a window member in a flat plate shape or a curved shape is disposed between the infrared heater and the electrode sheet to cut infrared light with a wavelength longer than the peak wavelength of the infrared light radiated from the infrared heater, and the window member extends for a certain width in a transfer direction of the electrode sheet and an opposite direction from the infrared heater.

5. The electrode sheet drying device according to claim 4, further comprising an air blowing device that blows dry air along the surface of the electrode sheet to cool the window member with the dry air.

6. The electrode sheet drying device according to claim 1, further comprising an infrared filter disposed between the opening and the electrode sheet to cut infrared light with a wavelength shorter than the detectable wavelength range of the infrared light detected by the radiation temperature sensor.

7. The electrode sheet drying device according to claim 1, further comprising a cooling device that cools the radiation temperature sensor.

8. The electrode sheet drying device according to claim 1, wherein a plurality of infrared heaters is disposed on both sides of the electrode sheet at intervals along the transfer path for the electrode sheet, and infrared heaters disposed on one side of the electrode sheet are disposed between infrared heaters disposed on the other side of the electrode sheet in a transfer direction of the electrode sheet.

9. The electrode sheet drying device according to claim 1, wherein various temperatures including a temperature of a structure around the radiation temperature sensor that affects a value measured by the radiation temperature sensor are detected, and the temperature of the back surface of the electrode sheet corresponding to the back side of the front surface portion of the electrode sheet that is the closest to the infrared heater is estimated based on detected values of the various temperatures including the temperature of the structure around the radiation temperature sensor.

* * * * *